W. JAMES.
ATTACHMENT FOR STILLS TO TEST THE PROOF OF SPIRITS.
No. 61,072. Patented Jan. 8, 1867.
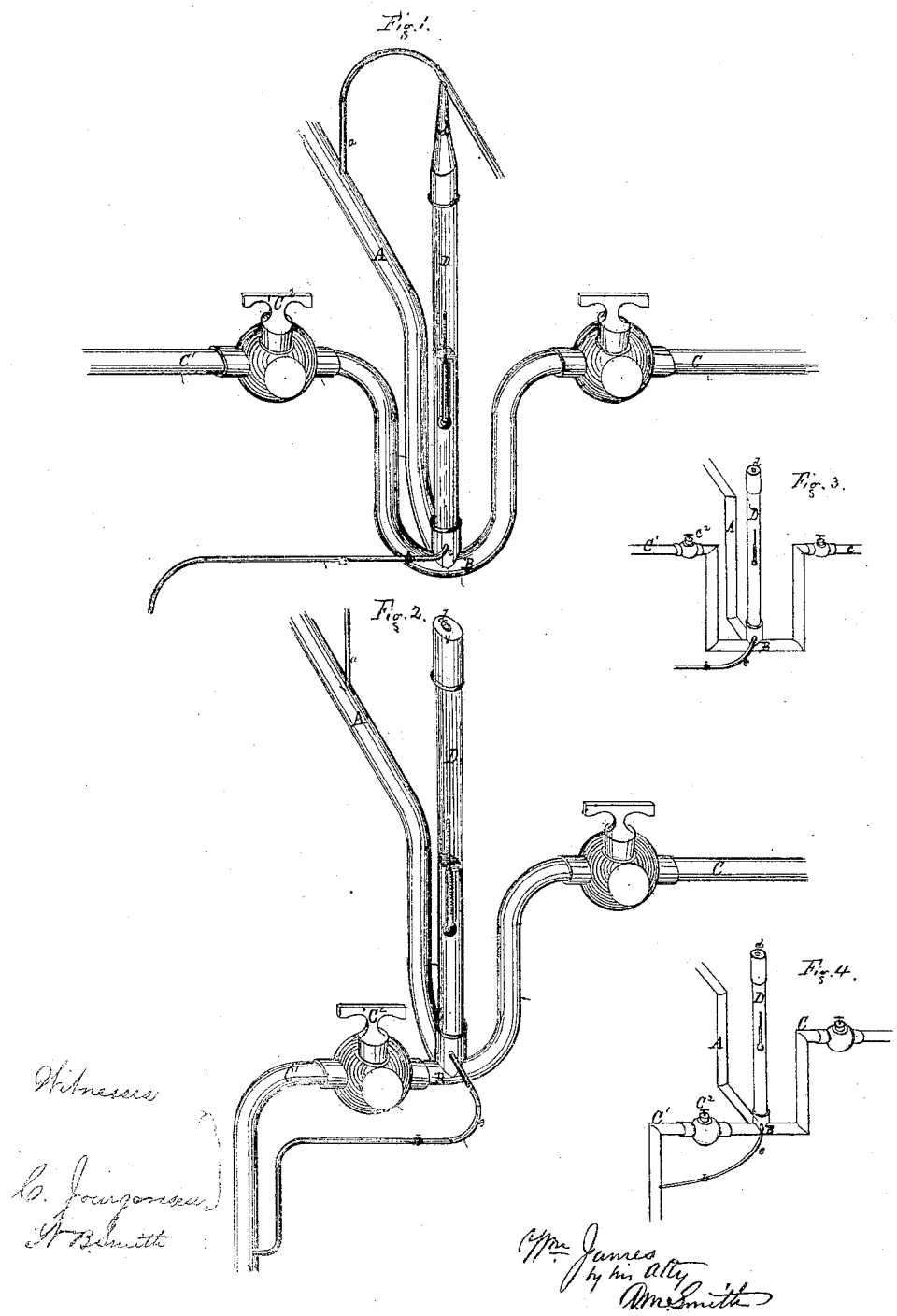

United States Patent Office

WILLIAM JAMES, OF RICHMOND, VIRGINIA.

*Letters Patent No. 61,072, dated January 8, 1867.*

---

IMPROVED ATTACHMENT FOR STILLS TO TEST THE PROOF OF SPIRITS.

---

*The Schedule referred to in these Letters Patent and making part of the same.*

---

TO ALL WHOM IT MAY CONCERN:

Be it known that I, WILLIAM JAMES, of Richmond, Henrico county, Virginia, have invented a new and useful apparatus for testing or indicating the strength or proof of spirits, which I call a Hydrostatic Pipe; and I do hereby declare the following to be a full, clear, and exact description of the construction and operation of the same, reference being had to the annexed drawings, making a part of this specification, in which—

Figure 1 is a perspective view of my improved apparatus.

Figure 2 is a similar view, representing a modification of the apparatus, with the low-wine pipe turned downward; and Figures 3 and 4 are diagrams, also showing modifications in the form of the pipe, &c, hereinafter explained.

Similar letters of reference denote corresponding parts in the several figures.

The object of my invention is to provide a means for ascertaining the strength or proof of spirits in its passage from the still, through the ordinary pipe by which it is conveyed to the tanks prepared for its reception; and to this end, it consists in forming a curve or bend in the pipe, and combining therewith at its lowest point, and in front of the upward bend or deflection, a glass tube, in which the liquor naturally rises to, and rests at the height of the elevated portion of the curved pipe, in its passage to the tanks, beyond the tube which contains the hydrometer, thereby affording a continual indicator, in a manner hereinafter explained. It further consists in the employment, in connection with the above, of certain valve or vent arrangements, whereby the formation of a vacuum is prevented, and a change of the spirits in the testing or indicator tube is effected, as hereinafter explained. In said drawings, A represents the end of the pipe proceeding from the still or condensing chamber, and which, in this instance, is connected to the lowest point of a bent pipe, B, the branches C $C^1$ of which are designed to convey the spirits to the high and low-wine tanks, as desired. C may represent the branch or arm which conducts it to the high-wine tank, and $C^1$ the one which connects with the low-wine tub or tank. The arm C is shown curved or turned upward from the point of connection of the pipe B to worm-pipe A, to any desired height, causing the spirits, in being forced into the high-wine tank, to rise and pass through each elevated portion of the pipe before it can escape into the tank. At or near the depressed or lowest point in the pipe, I attach a glass tube, D, containing the hydrometer, as shown in the drawing; said tube should be of a length sufficient to cause its upper end to rise considerably higher than the elevated portion of the pipe through which the liquor must pass, and the liquor, in being forced through the elevated portion of the pipe, is caused, naturally, to rise in the said tube to a level therewith. The tube D is provided with a valve or vent, $d$, which allows the escape of air or gas in the tube as the liquor rises therein; the still or worm-pipe is also provided with a small pipe or vent, $a$, in advance of the point of attachment to the indicator tube; this may be connected with the vent or valve $d$, in the manner shown in fig. 1, and the two, by allowing the free action of the atmospheric air from a point above the level to which the spirit rises, serve to prevent the formation of a vacuum in the indicator tube, and all danger of the bursting thereof is consequently avoided. These valves or vents may be provided with screens or other means for preventing the withdrawal of any portion of the spirits through them, or they may be extended, either separately, or after being united, as shown in fig. 1, and made to terminate in the tank-room, which is inaccessible except in the presence of a Government inspector, and all danger of an unauthorized removal or abstraction of spirits is obviated. The pipe $C^1$, which conducts to the low-wine tank, is shown in fig. 1, as arranged in a manner similar to the pipe C; and under this arrangement, the apparatus would indicate at all times, whether the high or low wines were passing, the strength of the spirits. But it only being necessary to know when the low wines are passing, for the purpose of separating them from the high wines, and running them off into the low-wine tank, to be returned and redistilled, this arrangement, in connection with the low-wine pipe is no longer needed, and the low-wine pipe or branch may consequently be turned downward, as shown by figs. 2 and 4 of the drawing, and the cock $C^2$, being turned to allow the escape to the low-wine tub, the tube D is emptied of its contents, and the hydrometer ceases to act until cock $C^2$ is closed and the liquor again rises in the arm C and tube D. $e$ is a small vent or pipe at the bottom of indicator tube C, by means of which said tube may at any moment be emptied of its contents, should there be any apprehension that the liquor or spirits in the tube was not changing with the flow of the same through the main; this vent or pipe should be made to connect with the low-wine tub or tank, so as to prevent its being tampered with. The high and low-wine pipes and vent pipe *e*, are provided with suitable cocks, whereby the apparatus is placed under the control of the attendant. The operation of the apparatus will be readily understood. The liquor is caused, in its passage from the still, to find in the glass tube its natural level, or, in other words, the same level with the point of its escape beyond the tube to the tank. The instrument known as Traill's hydrometer, which is generally used, or any ordinary instrument for indicating the strength or proof of the spirits, is placed in the tube, as indicated in the drawing. The advantages of the construction hereinabove set forth may be stated as follows, viz: The act of Congress dated July 13th, 1866, (Internal Revenue Laws,) prohibits distillers from access to the spirits, except in the presence of a Government inspector, and it becomes necessary, therefore, to provide some means whereby, without having access to the tanks, they may readily and at all times ascertain whether the high wines are passing, and when they are exhausted, in order that when so exhausted, and the low wines are found to be passing out, they may be immediately directed to the proper tank, from which they may be withdrawn for the purpose of redistillation. By the construction and arrangement hereinabove described, this object is attained, in a simple, effectual, and inexpensive manner, while at the same time all access to the spirits or tampering therewith is effectually prevented.

Having now described the principle of operation, together with one good, practical way in which my invention may be carried out, what I claim, and desire to secure by Letters Patent, is—

The combination of the indicator-tube with the bend or depression in the pipe through which the spirits is conveyed, whereby I am enabled continuously to test the strength or proof of the spirits passing through said pipe, substantially in the manner and for the purpose described.

I also claim the arrangement of the valves or vent pipes, in combination with the still or worm pipe, and the indicator-tube for preventing the formation of a vacuum and equalizing the pressure, substantially as described.

I also claim the employment of the vent or discharge pipe, at or near the base of the indicator-tube, substantially as described.

WM. JAMES.

Witnesses:
CHRIS. JOURGENSEN,
NORMAN B. SMITH.